Patented May 27, 1941

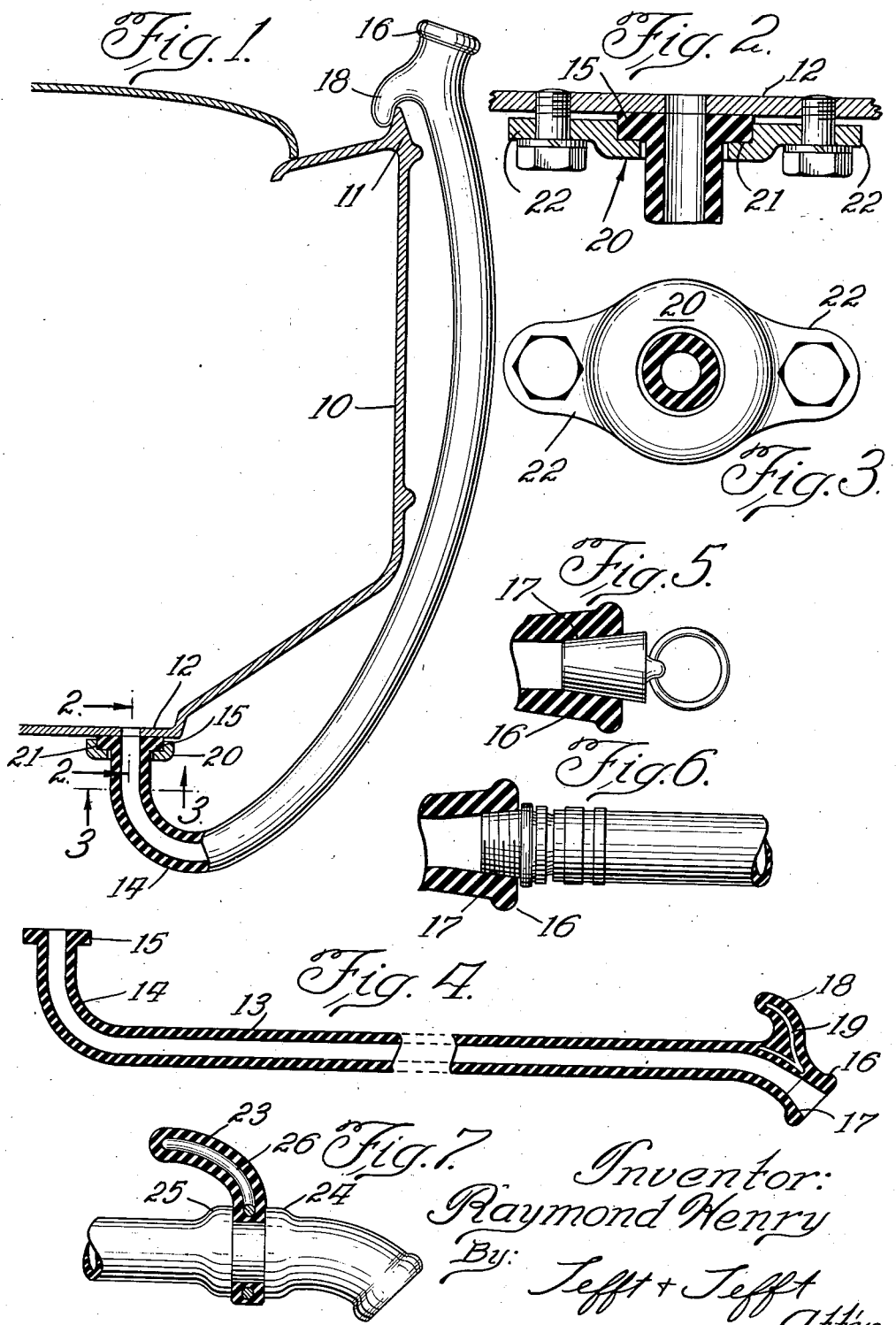

2,243,673

UNITED STATES PATENT OFFICE 2,243,673

MOLDED DRAIN HOSE

Raymond Henry, Rock Island, Ill.

Application July 4, 1939, Serial No. 282,758

3 Claims. (Cl. 221—84)

This invention relates to a drain hose for domestic washing machines and particularly to a novel molded rubber structure.

Although the draining of domestic washing machine tubs is a relatively simple matter, the facilities for such draining have been a continual source of annoying troubles. The reason for this is that extraneous articles such as buttons, marbles, nails, pebbles, hairpins, and the like are often left in the wash water. Strainers to prevent such articles from entering the drains have been largely ineffective because they rapidly become clogged with lint which is found in large quantities in wash water, and, as a result, strainers are soon removed by women operators.

The conventional screw plug faucets commonly used on washing machines although designed for easy cleaning are often clogged by foreign objects, and although the plugs can be completely removed and the faucet cleaned, this is an annoying procedure with a tub full of hot water.

Rubber drain hose hooked over the top of the washer tub have commonly been used in place of the metallic plug faucets. Such drain hose while less subject to clogging than faucets, are not entirely free of this fault because the metallic connection fittings commonly employed have some obstructions which permit foreign objects to lodge and become stuck. Further, such hose have been made of conventional fabric inserted rubber stock hose, and this hose when left in a normal position hooked over the top of the tub, becomes hard and stiff with the result that when unhooked for draining it refuses to assume a proper down-hanging drain position and must be held down by the operator's foot or by a flat iron or similar heavy object.

It is the particular object of this invention to provide a molded rubber drain hose presenting a smooth, unobstructed bore or passageway for drain water in order to prevent clogging.

Another object is to provide a molded rubber drain hose of such shape and quality rubber as will enable the hose to be easily hooked onto the tub in upright position and easily unhooked and assume the proper draining position.

A further object is to provide a molded rubber drain hose which provides its own connection gasket to the tub and which may be easily and fixedly attached by an exterior metallic fitting through which the hose may be inserted.

And a still further object is to provide a molded rubber drain hose having a taper formed outlet opening adapted to attach a garden hose or to be effectively plugged by a conventional plug.

Other objects and benefits will be disclosed in the following descriptions and drawing in which:

Fig. 1 is a cross sectional elevation view showing my molded rubber drain hose attached to a washing machine tub;

Fig. 2 is an enlarged broken cross sectional view showing the attachment of the drain hose to the tub as it would appear on the section lines 2—2 of Fig. 1;

Fig. 3 is a sectional plan view showing the attachment of the drain hose to the tub as it would appear on the section lines 3—3 of Fig. 1;

Fig. 4 is a broken cross sectional elevation view of my drain hose as it is molded in normal position;

Fig. 5 is an enlarged broken cross sectional elevation view showing the insertion of a tapered plug in the hose outlet;

Fig. 6 is an enlarged broken cross sectional elevation view showing the attachment of the male end of an ordinary garden hose; and Fig. 7 is an enlarged broken view of an optional arrangement of my hose outlet showing an attached hook member.

Now referring to the drawing, and at the outset particularly to Fig. 1, I show a washing machine tub 10 having a beaded rim 11 and a drain sump 12.

In Fig. 4 I show a view of my hose as molded having a straight central section 13, a curved elbow section 14, and a flange connector section 15. At the outlet end I have a beaded nozzle end 16 having a tapered internal bore 17. Integrally molded with the hose is the hook member 18 having a steel insert 19 incorporated therein.

In Figs. 2 and 3 I show the flanged coupling member 20 having an inward opening flanged recess 21 and bolting lugs 22. The inturned flange 21 is formed in such size and shape as to permit the rubber flange 15 of my drain hose to be inserted through the opening. I desire to particularly point out the depth of the flange 15 is greater than the depth of the flanged recess 21 and that, therefore, when inserted in the coupling 20 this extra depth of the flange 15 provides its own gasket against the tub sump 12.

I also desire to particularly point out that the bore of the hose from inlet to outlet is smooth and unobstructed and, therefore, eliminates as far as possible any opportunity for objects to become wedged and lodged therein.

In Figs. 5 and 6 I show how the tapered outlet 17 of my hose is made particularly adaptable to receive plugs or the male end of a garden hose. It will be carefully noted that the beaded nozzle end 16 provides the proper structure to firmly hold such plugs and hose connections.

Although my integrally molded hook member 18 is well adapted to hook over the rim of the tub and because of the flexibility of the hose may be easily unhooked, I recognize that such integrally formed hooks might become damaged through rough handling by careless operators. Therefore, in Fig. 7 I show a separately formed hook member 23 which is held between flanges 24 and 25 molded near the end of the hose. The rubber in my hose being of good quality to provide the necessary flexibility and long life, permits the hose to be collapsed sufficiently so that the separate hook member 23 can be mounted thereon. This separate hook member has a steel reinforcing member 26 to give it the required stiffness and stability, as is well understood in the art.

From the foregoing description it will be appreciated that I have provided a molded rubber hose of such form and shape that it can be easily hooked onto the rim of a tub and that when unhooked the hose will assume a proper downward draining position. With a free bore as described, my hose presents the minimum opportunity for clogging by foreign objects and my specially formed nozzle end provides means whereby a garden hose may be attached or the drain hose be plugged in an effective manner.

Having thus described my invention, I claim:

1. In a molded rubber drain hose for domestic washing machines, a beaded nozzle end on said hose, a molded rubber hook adjacent said nozzle end, a metallic reinforcement completely embedded and molded within the hook, and a tapered attachment opening in said nozzle.

2. In a molded rubber drain hose for domestic washing machines, a curved elbow section, a straight section adjoining the elbow section, an angular nozzle section adjoining the straight section, a rubber hook extending from the nozzle section, and a metallic reinforcement imbedded within said hook, the molded rubber material having a moderately stiff resilient body and a smooth unobstructed bore, and the sections of the hose being proportioned and arranged to permit the hose to be easily flexed into upright resilient supported position adjacent the tub without collapsing the hose and to be released to lowered discharge position.

3. In a molded rubber drain hose for domestic washing machines, a curved elbow section ending in a flat transverse attachment flange, a straight section adjoining the elbow section, a beaded nozzle section adjoining the straight section, a rubber hook extending from the nozzle section, and a metallic reinforcement imbedded within said hook, the molded rubber material having a moderately stiff resilient body and a smooth unobstructed bore, and the sections of the hose being proportioned and arranged to permit the hose to be easily flexed into upright resilient supported position adjacent the tub without collapsing the hose and to be released to lowered discharge position.

RAYMOND HENRY.